(12) United States Patent
Strait et al.

(10) Patent No.: US 9,976,928 B2
(45) Date of Patent: May 22, 2018

(54) TEST FLANGE ASSEMBLIES AND RELATED METHODS

(71) Applicant: Climax Portable Machine Tools, Inc., Newberg, OR (US)

(72) Inventors: David S. Strait, Lyle, WA (US); David Loyd Sorensen, Sherwood, OR (US); Joseba Brit Elola, Portland, OR (US); Karl Boyd Williams, Beaverton, OR (US); Brady Lynn Byers, Newberg, OR (US); David Michael Briggs, Carlton, OR (US)

(73) Assignee: Climax Portable Machine Tools, Inc., Newberg, OR (US)

( * ) Notice: Subject to any disclaimer, the term of this patent is extended or adjusted under 35 U.S.C. 154(b) by 125 days.

(21) Appl. No.: 15/260,850

(22) Filed: Sep. 9, 2016

(65) Prior Publication Data
US 2017/0146425 A1    May 25, 2017

Related U.S. Application Data

(60) Provisional application No. 62/259,241, filed on Nov. 24, 2015.

(51) Int. Cl.
*F16L 23/02* (2006.01)
*G01M 3/28* (2006.01)

(52) U.S. Cl.
CPC .......... *G01M 3/2853* (2013.01); *F16L 23/02* (2013.01)

(58) Field of Classification Search
CPC ............................ F16L 23/02; G01M 3/2853
See application file for complete search history.

(56) References Cited

U.S. PATENT DOCUMENTS

| | | | | |
|---|---|---|---|---|
| 2,357,411 | A * | 9/1944 | Leman | E21B 33/0422 285/123.14 |
| 5,236,037 | A * | 8/1993 | Watkins | E21B 33/04 166/89.1 |
| 7,128,143 | B2 * | 10/2006 | Van Bilderbeek | E21B 33/0422 166/96.1 |
| 7,410,002 | B2 * | 8/2008 | Khazanovich | E21B 33/0385 166/379 |
| 7,740,061 | B2 * | 6/2010 | Van Bilderbeek | E21B 33/03 166/75.13 |

(Continued)

*Primary Examiner* — David A Rogers
(74) *Attorney, Agent, or Firm* — DASCENZO Intellectual Property Law, P.C.

(57) ABSTRACT

Test flange assemblies comprise a flange body and a piston. The piston is configured to translate relative to the flange body and has an outer surface facing away from the flange body and an inner surface facing toward the flange body. The outer surface defines a circular seal channel for receiving a seal structure between the piston and a flange surface of a flanged component. The outer surface radially inward from the circular seal channel has a surface area that is less than a surface area of the inner surface. Methods of testing pressure containing structures comprise operatively positioning the test flange assembly, positioning a seal structure within the circular seal channel of the piston, coupling the flange body to a flanged component, and pressurizing a volume between the piston and the flange body so that the piston compresses the seal structure between the piston and the flanged component.

20 Claims, 8 Drawing Sheets

(56) References Cited

U.S. PATENT DOCUMENTS

| | | | |
|---|---|---|---|
| 7,913,754 B2* | 3/2011 | Bolding | E21B 33/068 166/263 |
| 2011/0120722 A1* | 5/2011 | Scranton | E21B 33/0355 166/360 |
| 2013/0251597 A1* | 9/2013 | Salazar | B01J 19/26 422/162 |
| 2017/0369285 A1* | 12/2017 | Ranger | B66C 1/28 |

\* cited by examiner

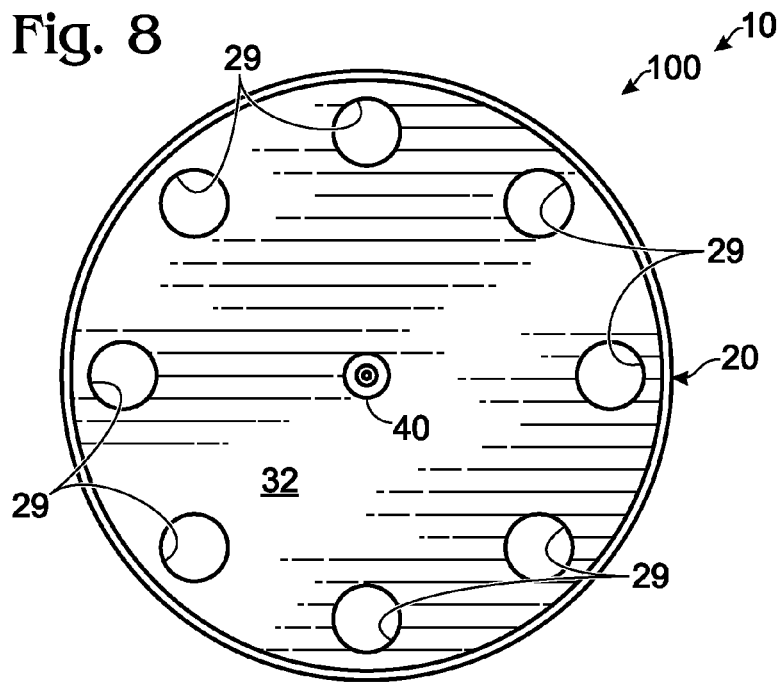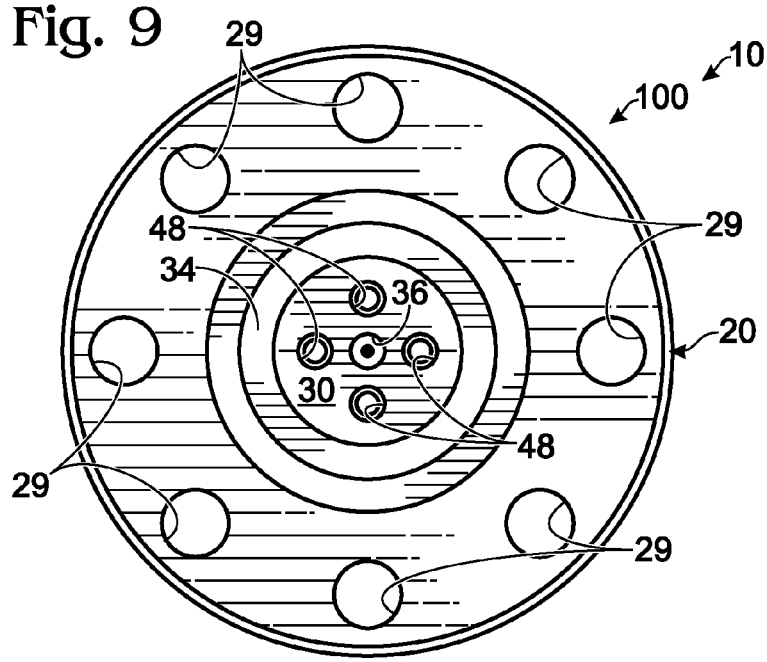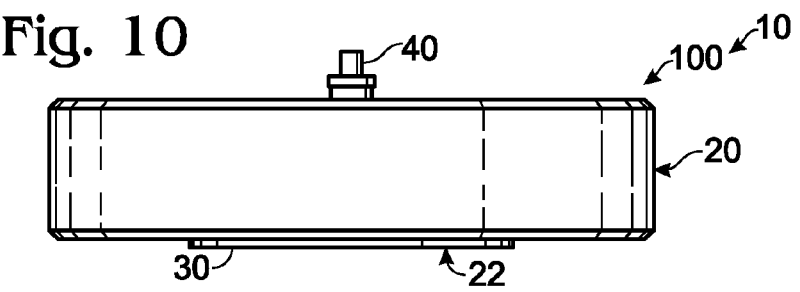

TEST FLANGE ASSEMBLIES AND RELATED METHODS

RELATED APPLICATION

This application claims priority to U.S. Provisional Patent Application No. 62/259,241, entitled "TEST FLANGE ASSEMBLIES AND RELATED METHODS" and filed on Nov. 24, 2015, the disclosure of which is incorporated herein by reference.

FIELD

The present disclosure relates to testing pressure containing structures with flanged connections.

BACKGROUND

Flanged connections are used in a variety of industries and applications. For example, flanged connections may be used to operatively connect adjacent sections of pipes, pipelines, or other various fluid carrying or containing structures, including (but not limited to) valves, metering equipment, test equipment, vessels, and the like. In some applications, the fluid carrying or containing structures, and thus the flanged connections, must withstand high fluid pressures. Typically, flanged connections utilize some form of sealing member (e.g., metallic, non-metallic, elastomeric, or composite seals) between two adjacent flange faces to operatively seal flanged connections. Moreover, it may be desirable, or even required by regulations, for flanged connections to be tested, and certified, for specific high pressure applications.

As an example of flanged connections that may require testing or certification, a wellhead is a component of a well, such as an oil or gas well, that provides structural and pressure-containing interfaces at the surface of the well, such as for drilling and production equipment. Accordingly, with reference to the example wellhead of FIG. 1, a wellhead may include various valves, fittings, chokes, tubing, casings, etc. The assembly above the well casings is often referred to as a Christmas tree and includes various fittings for attachment to downstream components during production of a well.

Typically, Christmas tree fittings utilize a so-called ring type joint, or RTJ, which may include a metallic, or other, seal that is operatively seated within a hexagonal channel defined between an outlet flange of a fitting and a flange of a downstream structure that is coupled to the outlet flange. Other types of joints include GRAYLOC™ type joints and joints that utilize lens ring gaskets. Such joints typically require significant labor to seal, including imparting high torques to numerous fasteners to operatively seat the seal and prepare it for testing under fluid high pressure.

Prior to being used in the field, a Christmas tree must be tested to ensure that it can withstand the pressures associated with extraction of high pressure fluid (e.g., oil or gas). Historically, to test a Christmas tree, and thereby certify it for field use, the various outlets of the Christmas tree are capped with a blind flange, such as illustrated in the example of FIG. 2. The retaining fasteners for such a blind flange must be torqued to a Christmas tree outlet to operatively seat the seal and to achieve a clamping force required to oppose the high pressure of the testing fluid. When a Christmas tree has numerous outlets, the procedure of capping all outlets is very time consuming. Upon capping all of the outlets, the Christmas tree is then pressurized with a non-compressible liquid (e.g., water, ethylene glycol, oil, or hydraulic fluid), for example, in the range of 2,500-30,000 psi. Upon being pressurized, the Christmas tree is examined for leaks using testing equipment.

While the above discussion and FIGS. 1 and 2 relate to wellheads and Christmas trees, such as used for oil and gas wells, the test flange assemblies and related methods disclosed herein are not limited to such applications.

SUMMARY

Test flange assemblies and methods of testing pressure containing structures are disclosed.

Test flange assemblies according to the present disclosure comprise a flange body and a piston that is operatively coupled to the flange body. The flange body is configured to be coupled to a flanged component. The piston is configured to selectively translate relative to the flange body and has an outer surface facing away from the flange body and an inner surface facing toward the flange body. The outer surface defines a circular seal channel for operatively receiving a seal structure between the piston and a flange surface of the flanged component. A portion of the outer surface radially inward from the circular seal channel has a surface area that is less than a surface area of the inner surface.

Methods according to the present disclosure comprise positioning a test flange assembly relative to a flanged component, positioning a seal structure within the circular seal channel of the piston, coupling the flange body to the flanged component, and pressurizing a volume between the piston and the flange body so that the piston compresses the seal structure between the piston and the flanged component.

BRIEF DESCRIPTION OF THE DRAWINGS

FIG. 8 is a top view of the test flange assembly of FIG. 4.

FIG. 9 is a bottom view of the test flange assembly of FIG. 4.

FIG. 10 is a side view of the test flange assembly of FIG. 4.

DESCRIPTION

Figure 1:
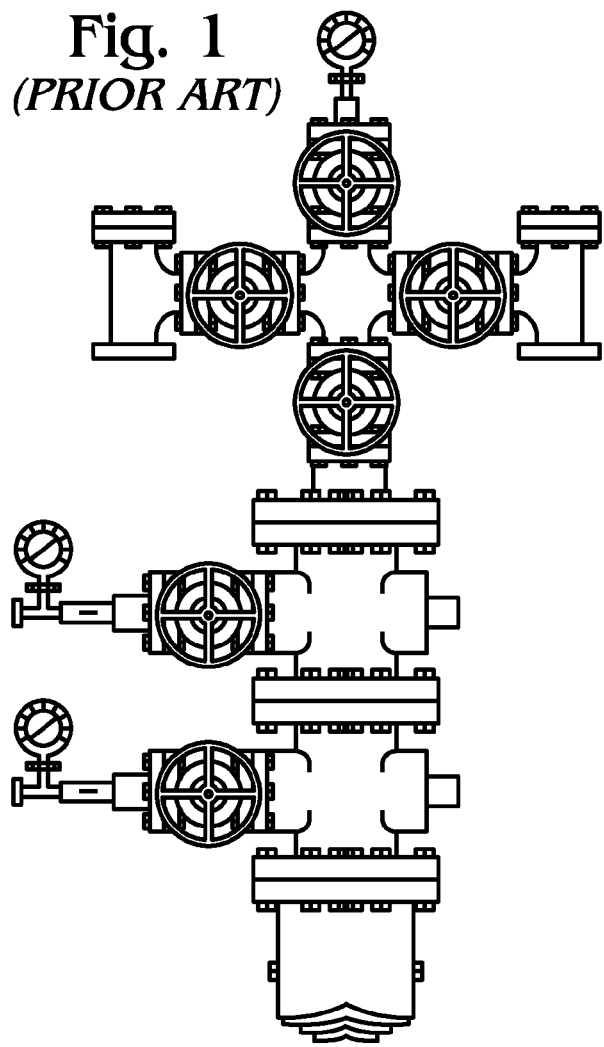
FIG. 1 is a side view of an example wellhead.
Figure 2:
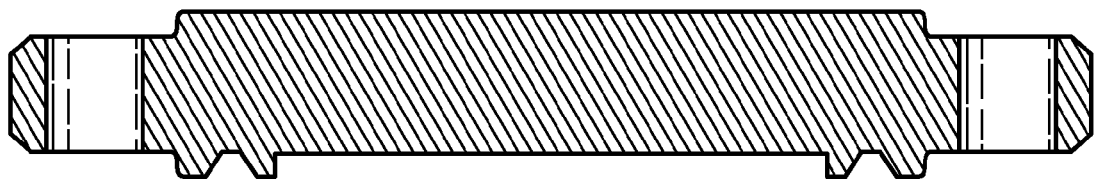
FIG. 2 is an example of a prior art blind flange.
Figure 3:
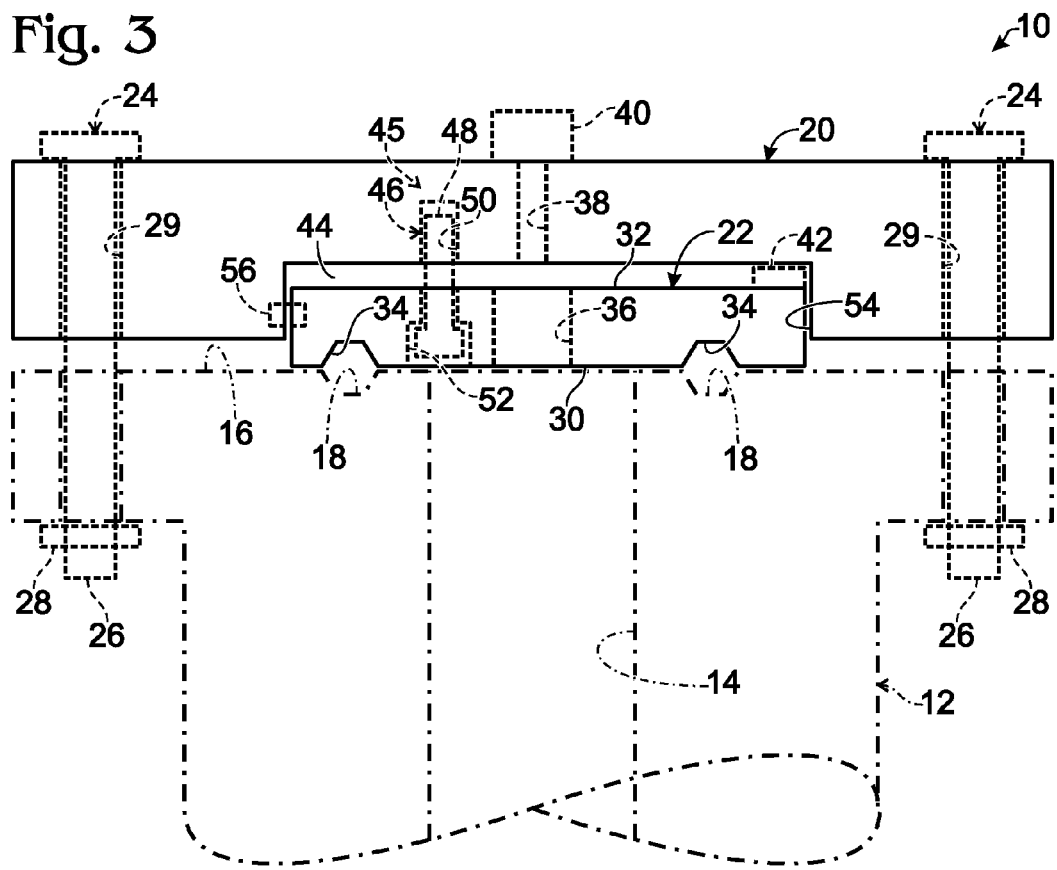
FIG. 3 is a schematic illustration representing test flange assemblies according to the present disclosure.

In FIG. 3, test flange assemblies 10 according to the present disclosure are schematically represented. In FIG. 3, elements that are likely to be included in a given example are illustrated in solid lines, while elements that are optional to a given example are illustrated in dashed lines. However, elements that are illustrated in solid lines are not essential to all examples of the present disclosure, and an element shown in solid lines may be omitted from a particular example without departing from the scope of the present disclosure. In FIG. 3, an example flanged component 12 is illustrated in dash-dot lines, schematically representing that the flanged component 12 is not a component part of test flange assemblies 10, but is illustrated to provide context for the use of test flange assemblies 10. As schematically illustrated, a flanged component 12 may include an internal bore 14, such as for carrying a high pressure fluid. For example, in the illustrative, non-exclusive example of a flanged component 12 in the form of a wellhead outlet of a well, the internal bore 14 may carry a high pressure fluid from a well to a downstream component connected to the wellhead outlet. Moreover, a flanged component 12 may include a planar face 16 that defines a circular seal channel 18 that is spaced radially outward from the internal bore 14 for operatively receiving a seal structure (e.g., a metallic, non-metallic, elastomeric, or other seal) between the planar face 16 and a downstream component connected to the flanged component 12. In some examples of flanged components 12, a cross-section of the circular seal channel 18 may be trapezoidal, such as to define a hexagon when mated with a corresponding circular seal channel of a downstream component. Test flange assemblies 10 may be configured for use with ring type joints (RTJs), GRAYLOC™ type joints, and/or joints that utilize lens ring gaskets; however, test flange assemblies 10 are not limited to such examples.

As schematically illustrated in solid lines in FIG. 3, test flange assemblies 10 include at least a flange body 20 and a piston 22 that is operatively coupled to the flange body 20.

The flange body 20 is configured to be operatively coupled to a flanged component 12 by any suitable mechanism, for example, depending on the configuration of the flanged component 12. For example, as schematically illustrated in FIG. 3, a plurality of fasteners 24, such as bolts 26 and corresponding nuts 28, may be used to operatively couple the flange body 20 to a flanged component 12. Accordingly, the flange body 20 may define a plurality of corresponding bolt holes 29 that extend through the flange body. However, other fastening mechanisms may be used to operatively couple a test flange assembly 10 to a flanged component 12.

The piston 22 is configured to selectively translate relative to the flange body 20 and includes an outer surface 30 that faces away from the flange body 20 and an inner surface 32 that faces the flange body 20. The outer surface 30 defines a circular seal channel 34 for operatively receiving a seal structure between the piston 22 and a surface of a flanged component 12. In some embodiments, a cross-section of the circular seal channel 34 is trapezoidal, such as to define a hexagon when mated with a corresponding circular seal channel 18 of a flanged component 12, The portion of the piston's outer surface 30 that is radially inward from the circular seal channel 34 has a surface area that is less than a surface area of an entirety of the piston's inner surface 32.

In some embodiments, the piston 22 defines a piston hole 36 that extends through the piston 22 from the outer surface 30 to the inner surface 32. In some such embodiments, when the flange body 20 is coupled to a flanged component 12, the piston hole 36 is in fluid communication with an internal bore 14 of the flanged component 12 and thus with an internal volume of the corresponding pressure containing structure, such as a wellhead. Accordingly, to prepare for testing a pressure containing structure having the flanged component 12, the internal volume of the pressure containing structure may be pressurized with a fluid, and with the pressurized fluid traveling through the piston hole 36 so that the pressurized fluid acts against the inner surface 32 of the piston 22. Because the surface area of the inner surface 32 is greater than the surface area of the portion of the outer surface 30 that is exposed to the internal bore 14 of the flanged component 12, a greater force is applied against the inner surface 32 than against the outer surface 30 by the pressurized fluid. As a result, the piston 22 is pressed against the flanged component 12, and, if the force differential is great enough, provides a sealing force that is great enough to operatively seal the flanged connection for testing the flanged component 12 with the pressurized fluid.

In some such embodiments, prior to pressurizing the internal volume of the pressure containing structure, the flange body 20 of the test flange assembly 10 may be operatively coupled to the flanged component 12, as discussed above. During such operatively coupling, the seal may be operatively seated within the circular seal channels 34 and 18 of the piston 22 and flanged component 12, respectively. For example, fasteners 24 may be tightened, or torqued, to an extent that the seal structure is operatively seated within the circular seal channels 34 and 18, but the differential force across the piston 22 as a result of the pressurized fluid may provide a motive force for increasing the seal force, such as for an adequate seal that withstands the pressurized fluid during a test or certification process of the flanged component 12. In some such embodiments, the torqueing of the fasteners 24 may be less than 400 ft·lbs, 300 ft·lbs, 200 ft·lbs, 100 ft·lbs, or 50 ft·lbs, or in the range of 25-400 ft·lbs, 25-200 ft·lbs, or 50-100 ft·lbs. Additionally or alternatively, the tightening or torqueing of fasteners 24 may be described as hand-tightening.

In some embodiments, the flange body 20 defines a fluid port 38 that extends through the flange body 20 and that is in fluid communication with the inner surface 32 of the piston 22. In some such embodiments, the test flange assembly 10 further includes a fluid fitting 40 that is operatively coupled to the fluid port 38 and that is configured to be operatively coupled to a supply of pressurized fluid. Accordingly, the fluid port 38 may be used to operatively deliver the pressurized fluid to the piston 22 to apply a force against the inner surface 32 and thereby operatively seat and/or seal a seal structure positioned within the circular seal channels 34 and 18. Also, in some such embodiments in which the piston 22 includes a piston hole 36, the fluid port 38 is in fluid communication with the piston hole 36. Accordingly, the pressurized fluid that is used to operatively seat and/or seal the seal structure may be the same pressurized fluid that is used to test the pressure containing structure itself.

In some applications, such as in the example of wellheads having multiple flanged components 12 to be tested, a test flange assembly 10 may be utilized with more than one flange component 12 during a test procedure. In some examples, a plurality of test flange assemblies 10 may be used, with each test flange assembly including a flange body 20 having a fluid port 38 and a piston 22 having a piston hole 36 for operatively pressurizing the pressure containing structure via the fluid port 38 and piston hole 36. In such examples, the pressurized fluid may be fed to the pressure containing structure from multiple points, that is, from one or more of the test flange assemblies 10. However, it also is within the scope of the present disclosure that a first subset of the plurality of test flange assemblies 10 (e.g., one) may each include a flange body 20 having a fluid port 38 and a piston 22 having a piston hole 36 for operatively pressurizing the pressure containing structure via the fluid port 38 and piston hole 36, while a second subset of the plurality may each include a flange body 20 that does not have a fluid port 38, but whose piston 22 does include a piston hole 36. Accordingly, if the various flanged components 12 are in fluid communication with each other via the internal volume of the pressure containing structure, only a single source of pressurized fluid need to be applied, and thus only one of the test flange assemblies 10 needs to have a fluid port 38.

In some embodiments, the flange body 20 includes a fluid port 38, and the piston 22 does not include a piston hole 36. In such embodiments, a pressurized fluid may be delivered to the inner surface 32 of the piston 22 via the fluid port 38, solely to press the piston 22 against flanged component 12 and thereby provide a seal force that is great enough to operatively seal the flanged connection for testing of the pressure containing structure. In such embodiments, the pressurized fluid delivered via the fluid port 38 may or may not be the same pressurized fluid used to pressurize the internal volume of the pressure containing structure during a test procedure.

In some embodiments, the piston 22 includes a projection 42 that extends from the inner surface 32 of the piston 22. When present, the projection 42 is configured to engage the flange body 20 to space the inner surface 32 of the piston 22 away from the flange body 20 and thereby define a volume 44 between the flange body 20 and the piston 22. In some such embodiments, the projection 42 is a circular projection, such as that extends from adjacent a periphery of the piston 22, thereby defining a cylindrical volume 44 between the inner surface 32 and the flange body 20.

In some embodiments, the test flange assembly 10 further includes a retention mechanism 45 for operatively retaining the piston 22 to the flange body 20, for example, permitting the piston 22 to freely float axially in relation to the flange body 20. As an illustrative, non-exclusive example, the retention mechanism 45 may include one or more assembly fasteners 46 that operatively couple the piston 22 to the flange body 20. In some such embodiments, the one or more assembly fasteners 46 include one or more threaded fasteners 48, the flange body 20 defines one or more threaded blind holes 50, the piston 22 defines one or more fastener bores 52, and the one or more threaded fasteners 48 extend through the one or more fastener bores 52 and are threadingly secured within the one or more threaded blind holes 50, such that the piston 22 is not tightened against the flange body 20, thereby permitting for the piston 22 to freely float axially relative to the flange body 20.

In some embodiments, the flange body 20 defines a piston recess 54, and at least a portion of the piston 22 is positioned within the piston recess 54, such that the inner surface 32 is positioned within the piston recess 54. In some such embodiments, the test flange assembly 10 further includes a seal member 56, such as an o-ring or o-ring energized seal, that is positioned between the piston 22 and the flange body 20 within the piston recess 54. The seal member 56, when present, restricts passage of fluid from the volume 44 past the piston 22, other than through the piston hole 36, if present.

Turning now to FIGS. 4-22, an illustrative non-exclusive example of a test flange assembly 10 in the form of test flange assembly 100 is illustrated. Where appropriate, the reference numerals from the schematic illustration of FIG. 3 are used to designate corresponding parts of test flange assembly 100; however, the example of FIGS. 4-22 is non-exclusive and does not limit test flange assemblies 10 to the illustrated embodiment of test flange assembly 100. That is, test flange assemblies 10 are not limited to the specific embodiment of the illustrated test flange assembly 100, and test flange assemblies 10 may incorporate any number of the various aspects, configurations, characteristics, properties, etc. of test flange assemblies 10 that are illustrated in and discussed with reference to the schematic representation of FIG. 3 and/or the embodiment of FIGS. 4-22, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to test flange assembly 100; however, it is within the scope of the present disclosure that the previously discussed features, variants, etc. may be utilized with test flange assembly 100.

Figure 4:
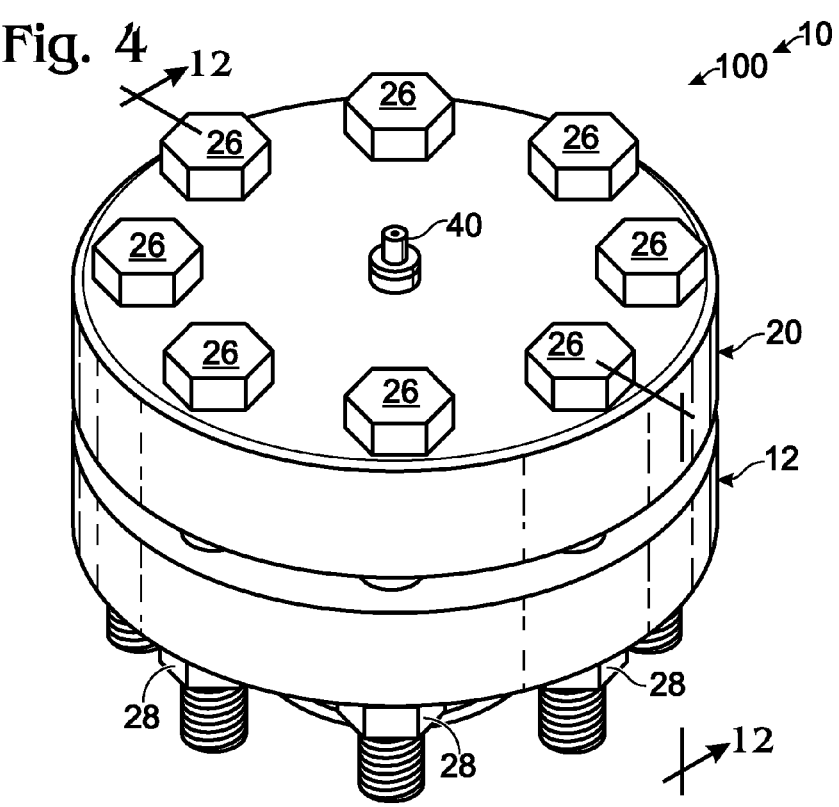
FIG. 4 is a top isometric view of an illustrative, non-exclusive example of a test flange assembly according to the present disclosure, shown installed on a flanged component.
Figure 6:
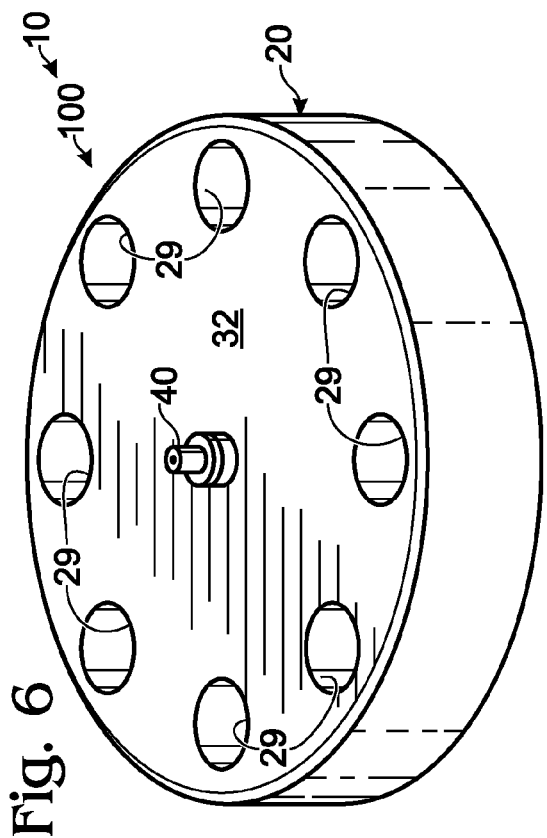
FIG. 6 is a top isometric view of the test flange assembly of FIG. 4.
Figure 7:
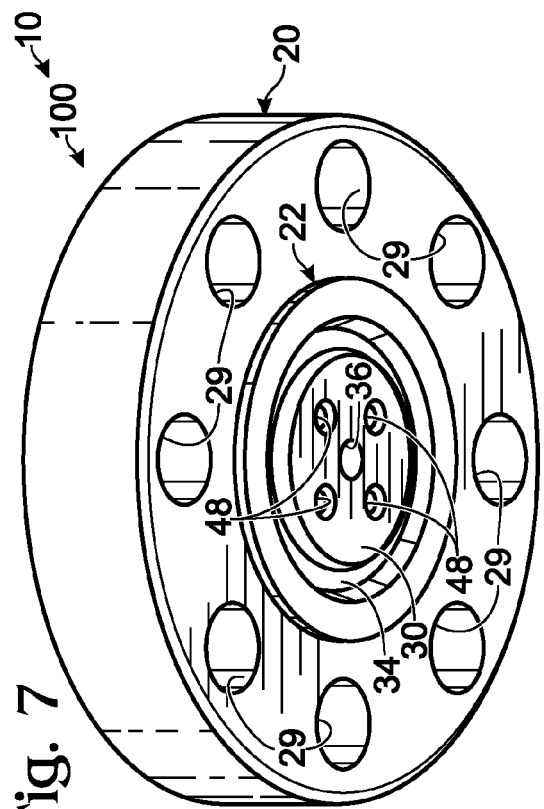
FIG. 7 is a bottom isometric view of the test flange assembly of FIG. 4.
Figure 5:
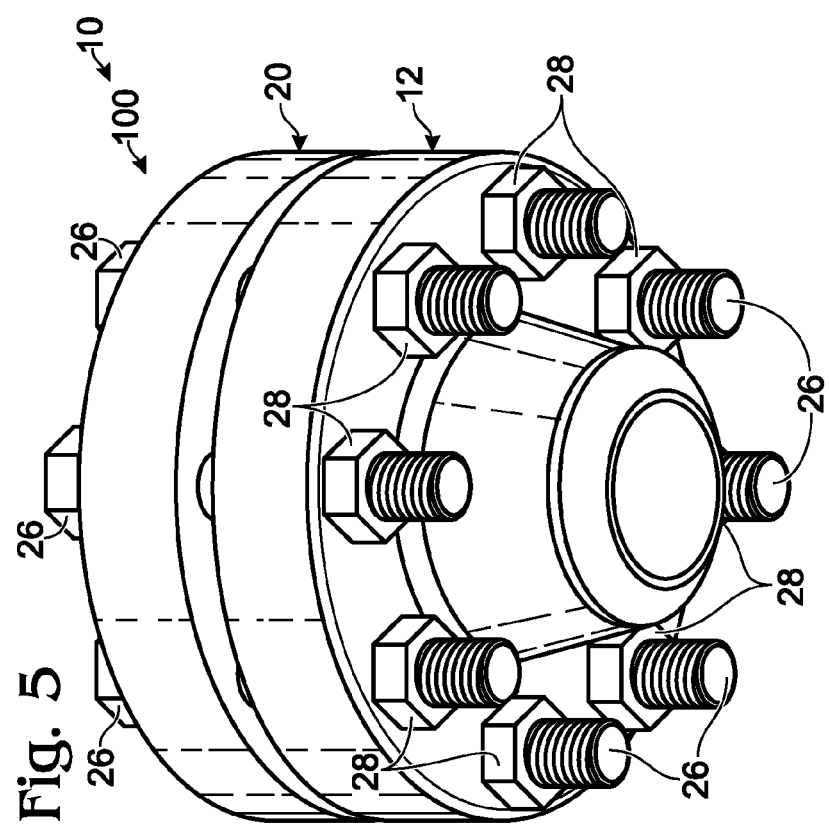
FIG. 5 is a bottom isometric view of the test flange assembly of FIG. 4, shown installed on a flanged component.
Figure 12:
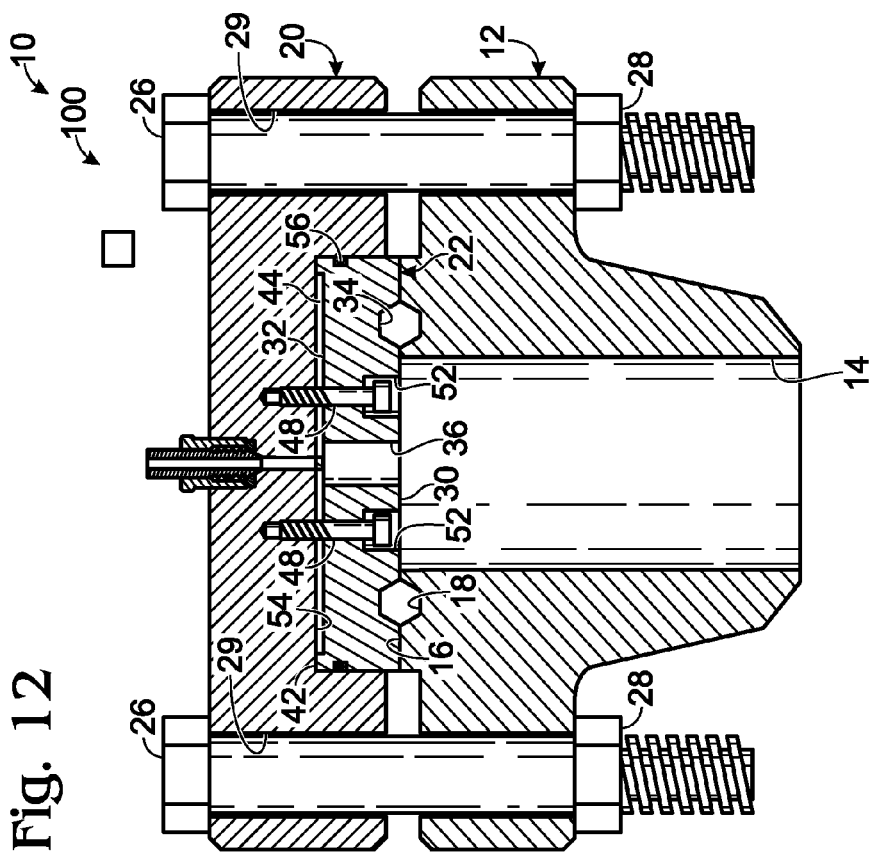
FIG. 12 is a cross-sectional view of the test flange assembly and flanged component of FIG. 4, taken along lines 12-12 in FIG. 4.
Figure 11:
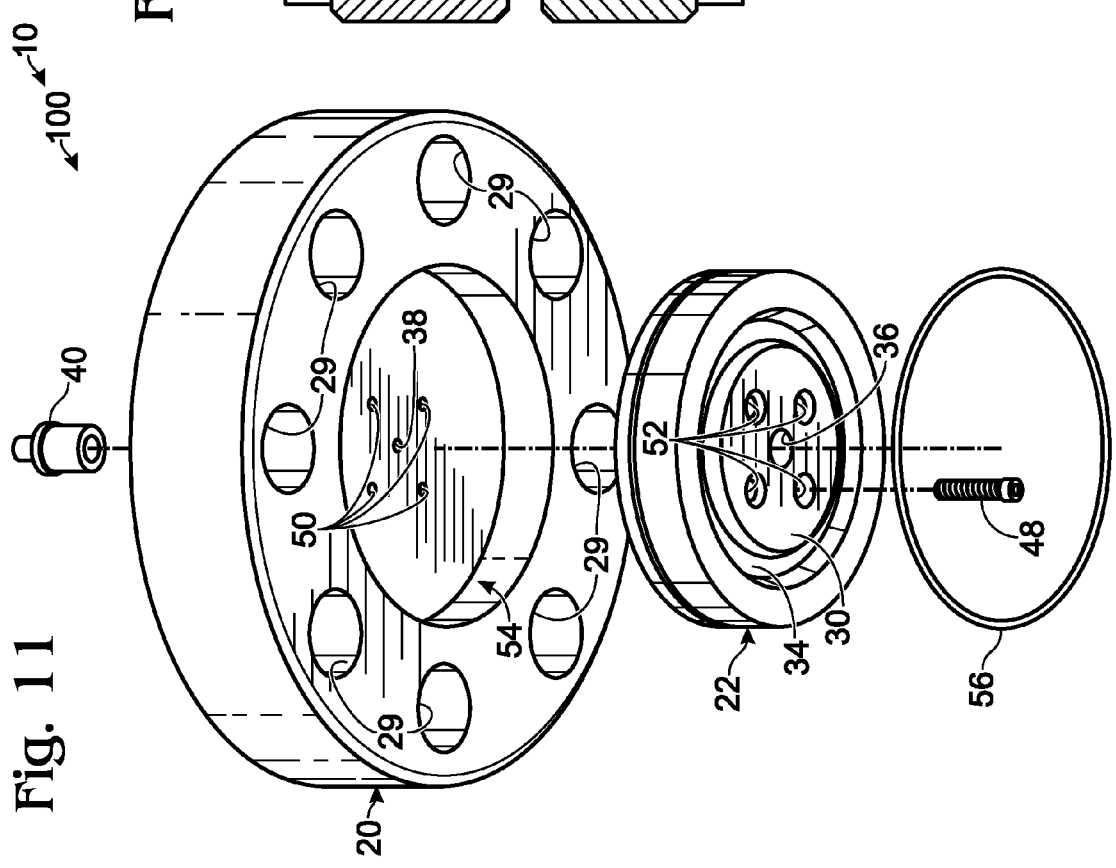
FIG. 11 is a bottom isometric exploded view of the test flange assembly of FIG. 4.
Figure 16:
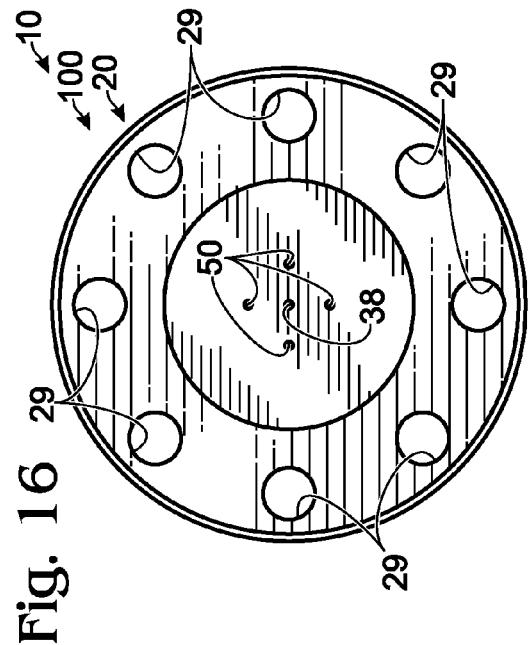
FIG. 16 is a bottom view of the flange body of the test flange assembly of FIG. 4.
Figure 15:
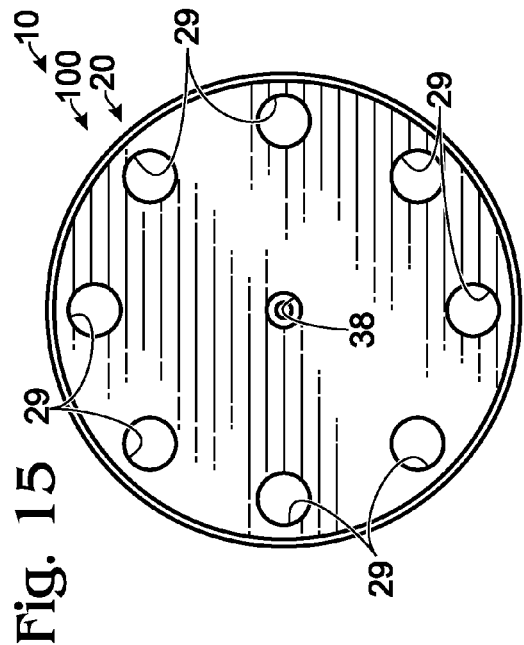
FIG. 15 is a top view of the flange body of the test flange assembly of FIG. 4.
Figure 14:
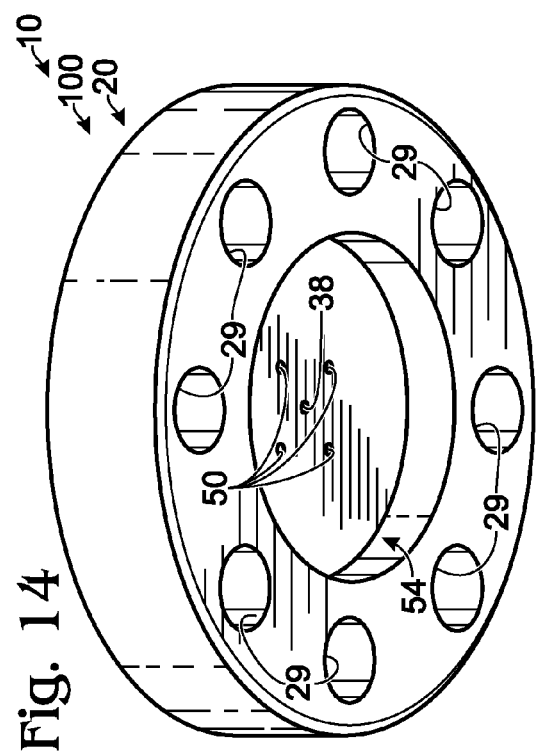
FIG. 14 is a bottom isometric view of the flange body of the test flange assembly of FIG. 4.
Figure 13:
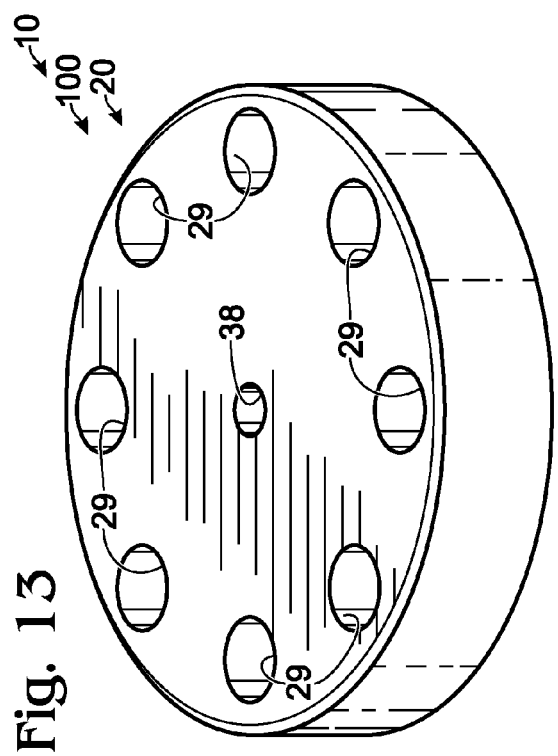
FIG. 13 is a top isometric view of the flange body of the test flange assembly of FIG. 4.
Figure 17:
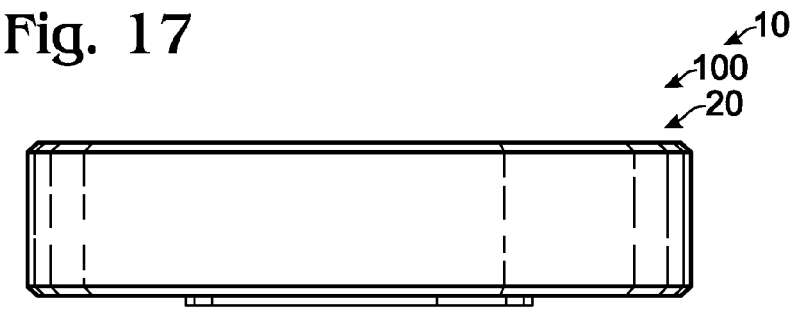
FIG. 17 is a side view of the flange body of the test flange assembly of FIG. 4.
Figure 18:
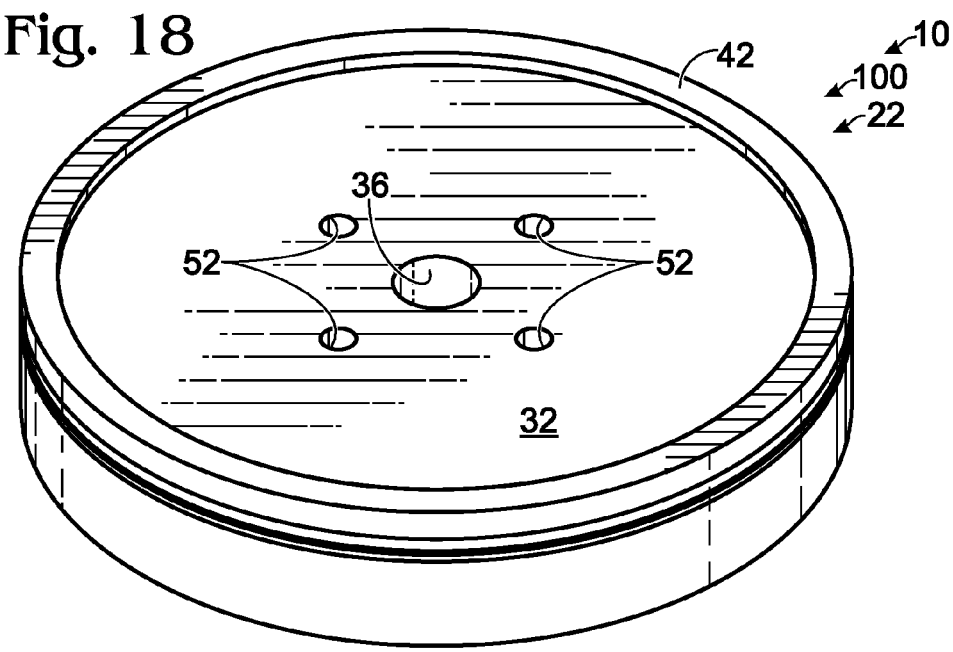
FIG. 18 is a top isometric view of the piston of the test flange assembly of FIG. 4.
Figure 19:
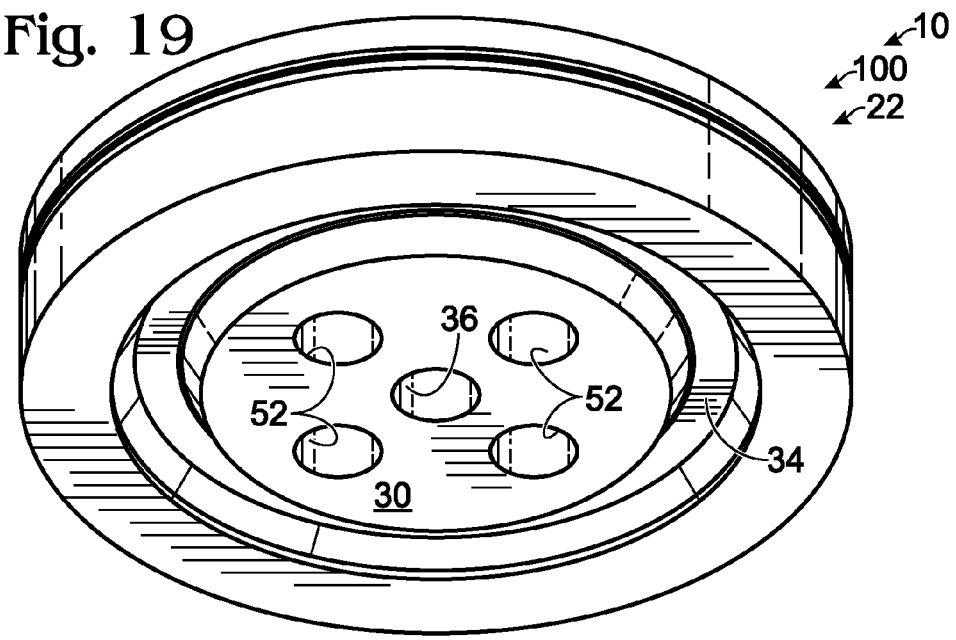
FIG. 19 is a bottom isometric view of the piston of the test flange assembly of FIG. 4.
Figure 22:
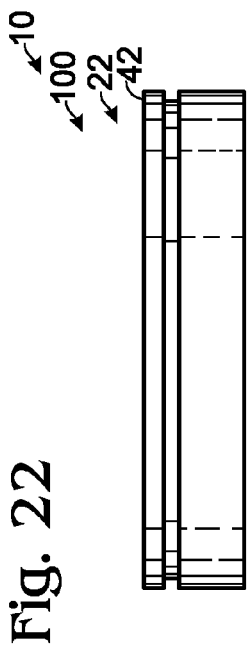
FIG. 22 is a side view of the piston of the test flange assembly of FIG. 4.

FIGS. 4 and 5 illustrate test flange assembly 100 operatively coupled to an example flanged component 12. As seen, test flange assembly 100 is an example of a test flange assembly 10 with a flange body 20 that is configured to be operatively secured to a flanged component 12 with a plurality of bolts 26 and nuts 28.

Test flange assembly 100 includes a piston 22 that defines a piston hole 36.

Test flange assembly 100 also includes a flange body 20 that defines fluid port 38 for connection to a fluid fitting 40, and in which the fluid port 38 is in fluid communication with the piston hole 36.

Test flange assembly 100 also includes a piston 22 having a circular projection 42 that extends from the inner surface 32 adjacent to the periphery of the piston 22 and thereby defines a cylindrical volume 44 between the piston's inner surface 32 and the flange body 20.

Test flange assembly 100 also includes four threaded fasteners 48 that extend through four corresponding fastener bores 52 through the piston 22 and that are threadingly engaged with four corresponding threaded blind holes 50 that extend into the flange body 20.

Test flange assembly 100 includes a flange body 20 that defines a piston recess 54, and also includes a seal member 56 (e.g., in the form of an o-ring or o-ring energized seal), that is positioned between the piston 22 and the flange body 20 within the piston recess 54.

Figure 23:
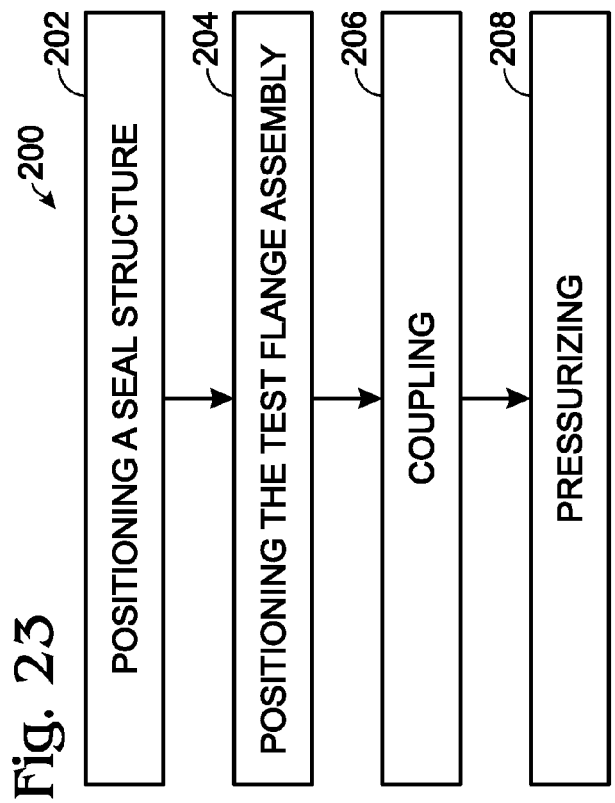
FIG. 23 is a flowchart schematically representing methods of testing pressure containing structures according to the present disclosure.
Figure 20:
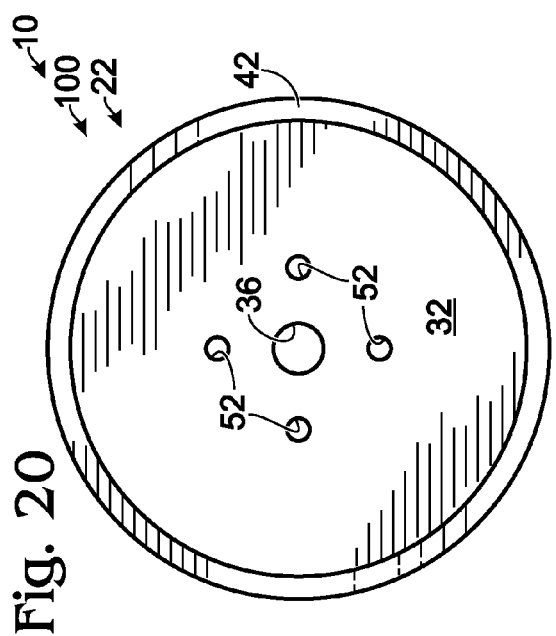
FIG. 20 is a top view of the piston of the test flange assembly of FIG. 4.
Figure 21:
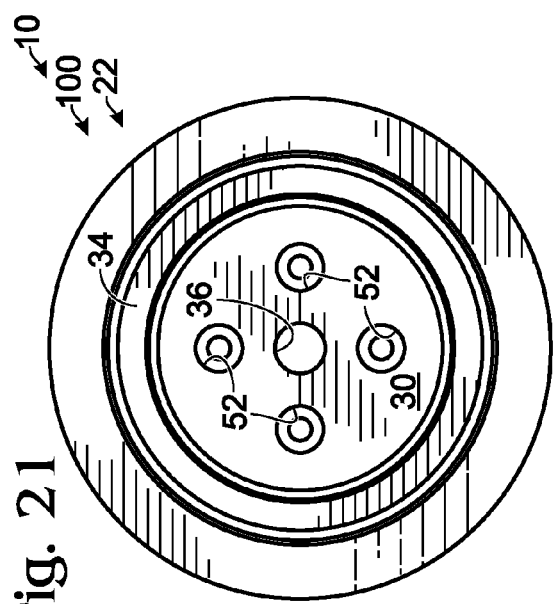
FIG. 21 is a bottom view of the piston of the test flange assembly of FIG. 4.

FIG. 23 schematically provides a flowchart that represents illustrative, non-exclusive examples of methods according to the present disclosure. The methods and steps illustrated in FIG. 23 are not limiting and other methods and steps are within the scope of the present disclosure, including methods having greater than or fewer than the number of steps illustrated, as understood from the discussions herein. Moreover, unless otherwise discussed herein, the illustrated and discussed steps of disclosed methods are not required to be performed in the order illustrated in FIG. 23.

Methods 200 of testing a pressure containing structure include positioning a seal structure, such as within the circular seal channel 34 of the piston 22 of a test flange assembly 10 or within the circular seal channel 18 of a flanged component 12, as indicated at 202, positioning the test flange assembly 10 relative to a flanged component 12, as indicated at 204; coupling the flange body 20 to the flanged component 12, as indicated at 206; and pressurizing a volume between the piston 22 and the flange body 20 so that the piston 22 compresses the seal structure between the piston 22 and the flanged component 12, as indicated at 208.

In some methods 200, the coupling, at 206, includes fastening the flange body 20 to the flanged component 12 with a plurality of fasteners 24, such as bolts 26 and corresponding nuts 28. In some such methods 200, the fastening includes torqueing of the fasteners 24 less than 400 ft·lbs, 300 ft·lbs, 200 ft·lbs, 100 ft·lbs, or 50 ft·lbs, or in the range of 25-400 ft·lbs, 25-200 ft·lbs, or 50-100 ft·lbs. Additionally or alternatively, the fastening may be described as hand-tightening the fasteners 24. Accordingly, in some methods 200, the coupling, at 206, may take significantly less time than prior art methods utilizing blind flanges that require much higher and more precise torqueing of multiple fasteners.

In some methods 200, the pressurizing, at 208, includes applying a pressure in the range of 2,500-30,000 psi.

In some methods 200, the pressurizing, at 208, includes pressurizing the pressure containing structure.

In some methods 200, the pressurizing, at 208, includes pressurizing with a non-compressible fluid liquid, such as water, ethylene glycol, oil, or hydraulic fluid.

Illustrative, non-exclusive examples of inventive subject matter according to the present disclosure are described in the following enumerated paragraphs:

A. A test flange assembly, the test flange assembly comprising:

a flange body configured to be coupled to a flanged component; and a piston operatively coupled to the flange body, wherein the piston is configured to selectively translate relative to the flange body, wherein the piston has an outer surface facing away from the flange body and an inner surface facing toward the flange body, wherein the outer surface defines a circular seal channel for operatively receiving a seal structure between the piston and a flange surface of the flanged component, and wherein a portion of the outer surface radially inward from the circular seal channel has a surface area that is less than a surface area of the inner surface.

A1. The test flange assembly of paragraph A, wherein piston defines a piston hole extending through the piston from the outer surface to the inner surface.

A1.1. The test flange assembly of paragraph A1, wherein when the flange body is coupled to the flanged component, the piston hole is in fluid communication with an internal bore of the flanged component.

A2. The test flange assembly of any of paragraphs A-A1.1, wherein the flange body defines a fluid port extending through the flange body and in fluid communication with the inner surface of the piston.

A2.1. The test flange assembly of paragraph A2, further comprising:

a fluid fitting operatively coupled to the fluid port and configured to be operatively coupled to a supply of pressurized fluid.

A2.2. The test flange assembly of any of paragraphs A2-A2.1 when depending from paragraph A1.1, wherein the fluid port is in fluid communication with the piston hole.

A3. The test flange assembly of any of paragraphs A-A2.2, wherein the piston includes a projection extending from the inner surface of the piston and configured to engage the flange body to space the inner surface of the piston away from the flange body and thereby define a volume between the flange body and the piston.

A3.1. The test flange assembly of paragraph A3, wherein the projection is a circular projection, optionally extending from adjacent a periphery of the piston.

A4. The test flange assembly of any of paragraphs A-A3.1, further comprising:

a retention mechanism that operatively retains the piston to the flange body.

A4.1. The test flange assembly of paragraph A4, wherein the retention mechanism permits the piston to freely float axially in relation to the flange body.

A4.2. The test flange assembly of any of paragraphs A4-A4.1, wherein the retention mechanism includes one or more assembly fasteners that operatively couple the piston to the flange body.

A4.2.1. The test flange assembly of paragraph A4.2, wherein the one or more assembly fasteners include one or more threaded fasteners, wherein the flange body defines one or more threaded blind holes, wherein the piston defines one or more fastener bores, and wherein the one or more threaded fasteners extend through the one or more fastener bores and are threadingly secured within the one or more threaded blind holes, such that the piston is not tightened against the flange body.

A5. The test flange assembly of any of paragraphs A-A4.2.1, wherein the flange body defines a piston recess, and wherein the inner surface of the piston is positioned within the piston recess.

A5.1. The test flange assembly of paragraph A5, further comprising:

a seal member, optionally an o-ring or an o-ring energized seal, positioned between the piston and the flange body, wherein the seal member restricts passage of fluid from the piston recess to between the flange body and the piston.

A6. The test flange assembly of any of paragraphs A-A5.1, further comprising:

a plurality of fasteners configured to operatively couple the flange body to the flanged component.

A6.1. The test flange assembly of paragraph A6, wherein the plurality of fasteners includes a plurality of bolts and corresponding nuts, and wherein the flange body defines a plurality of corresponding bolt holes extending through the flange body.

A7. A plurality of the test flange assembly of any of paragraphs A-A6.1, wherein each of the plurality includes the subject matter of any of paragraphs A2-A2.2.

A8. A plurality of the test flange assembly of any of paragraphs A-A6.1, wherein a first subset of the plurality includes the subject matter of any of paragraphs A2-A2.2, and wherein a second subset of the plurality does not include the subject matter of paragraphs A2-A2.2.

A9. The test flange assembly(ies) of any of paragraphs A-A8 in combination with the flanged component, wherein the flange body is coupled to the flanged component.

A10. The use of the test flange assembly(ies) of any of paragraphs A-A8 to test a pressure containing structure.

B. A method of testing a pressure containing structure, the method comprising:
  positioning the test flange assembly of any of paragraphs A-A6.1 relative to a flanged component;
  positioning a seal structure within the circular seal channel of the piston;
  coupling the flange body to the flanged component; and
  pressurizing a volume between the piston and the flange body so that the piston compresses the seal structure between the piston and the flanged component.

B1. The method of paragraph B, wherein the coupling the flange body to the flanged component includes fastening the flange body to the flanged component with a plurality of fasteners.

B1.1. The method of paragraph B, wherein the fastening includes torqueing of the plurality of fasteners less than 400 ft·lbs, 300 ft·lbs, 200 ft·lbs, 100 ft·lbs, or 50 ft·lbs, or in the range of 25-400 ft·lbs, 25-200 ft·lbs, or 50-100 ft·lbs.

B2. The method of any of paragraphs B-B1.1, wherein the pressurizing includes applying a pressure in the range of 2,500-30,000 psi.

B3. The method of any of paragraphs B-B2, wherein the pressurizing includes pressurizing the pressure containing structure.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A test flange assembly, the test flange assembly comprising:
  a flange body configured to be coupled to a flanged component; and
  a piston operatively coupled to the flange body, wherein the piston is configured to selectively translate relative to the flange body, wherein the piston has an outer surface facing away from the flange body and an inner surface facing toward the flange body, wherein the outer surface defines a circular seal channel for operatively receiving a seal structure between the piston and a flange surface of the flanged component, and wherein a portion of the outer surface radially inward from the circular seal channel has a surface area that is less than a surface area of the inner surface.

2. The test flange assembly of claim 1, wherein the piston defines a piston hole extending through the piston from the outer surface to the inner surface.

3. The test flange assembly of claim 2, wherein when the flange body is coupled to the flanged component, the piston hole is in fluid communication with an internal bore of the flanged component.

4. The test flange assembly of claim 1, wherein the flange body defines a fluid port extending through the flange body and in fluid communication with the inner surface of the piston.

5. The test flange assembly of claim 4, further comprising:
  a fluid fitting operatively coupled to the fluid port and configured to be operatively coupled to a supply of pressurized fluid.

6. The test flange assembly of claim 4, wherein when the flange body is coupled to the flanged component, the piston hole is in fluid communication with an internal bore of the flanged component, and wherein the fluid port is in fluid communication with the piston hole.

7. The test flange assembly of claim 1, wherein the piston includes a projection extending from the inner surface of the piston and configured to engage the flange body to space the inner surface of the piston away from the flange body and thereby define a volume between the flange body and the piston.

8. The test flange assembly of claim 7, wherein the projection is a circular projection extending from adjacent a periphery of the piston.

9. The test flange assembly of claim 1, further comprising:
  a retention mechanism that operatively retains the piston to the flange body.

10. The test flange assembly of claim 9, wherein the retention mechanism permits the piston to freely float axially in relation to the flange body.

11. The test flange assembly of claim 9, wherein the retention mechanism includes one or more assembly fasteners that operatively couple the piston to the flange body.

12. The test flange assembly of claim 11, wherein the one or more assembly fasteners include one or more threaded fasteners, wherein the flange body defines one or more threaded blind holes, wherein the piston defines one or more fastener bores, and wherein the one or more threaded fasteners extend through the one or more fastener bores and are threadingly secured within the one or more threaded blind holes, such that the piston is not tightened against the flange body.

13. The test flange assembly of claim 1, wherein the flange body defines a piston recess, and wherein the inner surface of the piston is positioned within the piston recess.

14. The test flange assembly of claim 13, further comprising:
  a seal member positioned between the piston and the flange body, wherein the seal member restricts passage of fluid from the piston recess to between the flange body and the piston.

15. The test flange assembly of claim 1, further comprising:
  a plurality of fasteners configured to operatively couple the flange body to the flanged component.

16. The test flange assembly of claim 15, wherein the plurality of fasteners includes a plurality of bolts and corresponding nuts, and wherein the flange body defines a plurality of corresponding bolt holes extending through the flange body.

17. A plurality of the test flange assembly of claim 1,
wherein the plurality includes a first subset of test flange assemblies, wherein the flange body of each of the first subset defines a fluid port extending through the flange body and in fluid communication with the inner surface of the piston; and
wherein the plurality includes a second subset of test flange assemblies, wherein the flange body of each of the second subset is free of a fluid port extending through the flange body and in fluid communication with the inner surface of the piston.

18. The test flange assembly of claim 1 in combination with the flanged component, wherein the flange body is coupled to the flanged component.

19. A method of testing a pressure containing structure, the method comprising:
positioning the test flange assembly of claim 1 relative to a flanged component;
positioning a seal structure within the circular seal channel of the piston;
coupling the flange body to the flanged component, wherein the coupling the flange body to the flanged component includes fastening the flange body to the flanged component with a plurality of fasteners, and wherein the fastening includes torqueing of the fasteners less than 400 ft·lbs; and
pressurizing a volume between the piston and the flange body so that the piston compresses the seal structure between the piston and the flanged component, wherein the pressurizing includes applying a pressure in the range of 2,500-30,000 psi.

20. A test flange assembly, the test flange assembly comprising:
a flange body configured to be coupled to a flanged component, wherein the flange body defines a piston recess;
a piston operatively coupled to the flange body, wherein the piston is configured to selectively translate relative to the flange body, wherein the piston has an outer surface facing away from the flange body and an inner surface facing toward the flange body, wherein the inner surface of the piston is positioned within the piston recess, wherein the outer surface defines a circular seal channel for operatively receiving a seal structure between the piston and a flange surface of the flanged component, wherein a portion of the outer surface radially inward from the circular seal channel has a surface area that is less than a surface area of the inner surface, wherein the piston includes a projection extending from the inner surface of the piston and configured to engage the flange body to space the inner surface of the piston away from the flange body and thereby define a volume between the flange body and the piston, and wherein the projection is a circular projection extending from adjacent a periphery of the piston;

a retention mechanism that operatively retains the piston to the flange body, wherein the retention mechanism permits the piston to freely float axially in relation to the flange body, wherein the retention mechanism includes one or more assembly fasteners that operatively couple the piston to the flange body, and wherein the one or more assembly fasteners include one or more threaded fasteners, wherein the flange body defines one or more threaded blind holes, wherein the piston defines one or more fastener bores, and wherein the one or more threaded fasteners extend through the one or more fastener bores and are threadingly secured within the one or more threaded blind holes, such that the piston is not tightened against the flange body;

a seal member positioned between the piston and the flange body, wherein the seal member restricts passage of fluid from the piston recess to between the flange body and the piston; and a plurality of bolts and corresponding nuts configured to operatively couple the flange body to the flanged component, wherein the flange body defines a plurality of corresponding bolt holes extending through the flange body.

* * * * *